Dec. 26, 1961 R. R. MYERS 3,014,520

MEANS FOR BONDING THE LAMINATIONS OF PRINTING PLATES

Filed Aug. 7, 1958

Inventor
Robert R. Myers
by M. Talbert Dick
Attorney

Witness
Edward P. Seeley

United States Patent Office 3,014,520

Patented Dec. 26, 1961

3,014,520

MEANS FOR BONDING THE LAMINATIONS OF PRINTING PLATES

Robert R. Myers, 561 Washington, Chicago, Ill.
Filed Aug. 7, 1958, Ser. No. 753,671
1 Claim. (Cl. 100—93)

This invention relates to the printing art and more particularity to a method of and means for bonding the laminations of laminated printing plates.

Curved laminated printing plates are now in general use for publishing both magazines and newspapers. While time is not a serious problem in the printing of magazines and the like, newspaper printing requires the utmost speed in the process of plate manufacture. Relatively thin laminated printing plates have been produced for magazine publications, but substantially all newspaper printing presses are set for arcuate printing plates of approximately one-half inch in thickness. Therefore, considerable cost is involved and it becomes necessary to salvage for subsequent usage the rather thick backing plate. This is one of the reasons that newspaper publishing cannot well use the lightweight plates used in the magazine field.

Many serious problems therefore result in the attempted production of laminated plates for newspaper use. The present system is assembling the laminations of the plate to be made and pressure bonding the plate by placing it in a rubber diaphragm press of great pressure with temperatures of approximately two hundred and fifty degrees Farenheit. A resilient diaphragm is used because such plates have high and low areas, i.e. the printing areas are high and the non-printing areas are low. The plate is placed under the pressure of the press, then heated, then cooled and lastly removed from the press. This procedure may require up to twenty minutes per plate and is decidedly too slow for most newspaper requirements.

Therefore one of my principal objects of my invention is to provide a method of and means for rapidly bonding the laminations of laminated printing plates.

A further object of this invention is to provide a successful device for bonding laminations of printing plates that may be operated without the services of a skilled workman.

A still further object of my invention is to provide a means for pressing, heating and bonding the laminations of printing plates that is capable of turning out plates on a chain production basis.

A still further object of my invention is to provide a machine for bonding the laminations of laminated printing plates that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
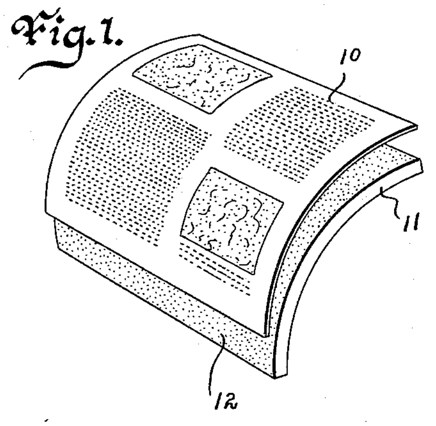
FIG. 1 is a perspective view of the laminations of a printing plate about to be bonded together.
Figure 3:
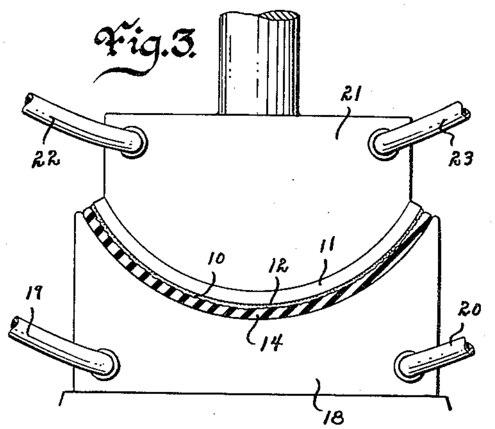
FIG. 3 is an enlarged cross sectional view of my machine taken on line 3—3 of FIG. 2 and more fully illustrates its construction.

In general, the laminations of a printing plate comprise a printing face sheet 10, and a saddle or backing plate 11 of aluminum, magnesium or the like. A suitable adhesive 12 is placed between the two plates 10 and 11. Minnesota Mining Co. hot adhesive number sixty-two is a satisfactory bonding glue.

The numeral 13 designates the frame of my device. Rotatably mounted and spaced apart on the frame 13 are two parallel horizontal shafts 15 and 16. Rigidly secured to each shaft is a concave pulley wheel 17. The numeral 14 designates a flexible resilient rubber or like concave endless belt embracing the two concave pulley wheels 17.

Directly below the upper area of the belt and between the two pulley wheels is the hollow jaw 18 of a concave press. The numerals 19 and 20 designate inlet and outlet conduits respectively, communicating with the inside of the jaw 18 and adapted to be in communication with a source means of heat such as that of a steam boiler. The numeral 21 designates the upper hollow movable jaw of the press and which is convex to complement the concave lower jaw 18. The jaw 21 also has two inlet and outlet conduits 22 and 23 adapted to be in communication with a heat source means such as a steam boiler. The jaw 21 is positioned above the belt. Directly below the upper area of the belt, between the pulley wheels and to the right of the jaw 18 is a second hollow jaw 24 of a concave press. The numerals 25 designate conduits communicating with the inside of the hollow concave jaw 24 and adapted to be in communication with a chilling means such as a cold water source. The numeral 26 designates the upper hollow movable jaw of the second press and which is convex to complement the concave structure of the lower jaw. This upper jaw 26 also has conduits 27 in communictaion with a coolant source. It is located above the belt. The two lower concave jaws 18 and 24 are in longitudinal alignment and in alignment with the upper area of the belt as shown in the drawings. Therefore, the jaws 18 and 24 act both as guideways for the convex belt and also support the underside of the upper area of the belt.

Figure 2:
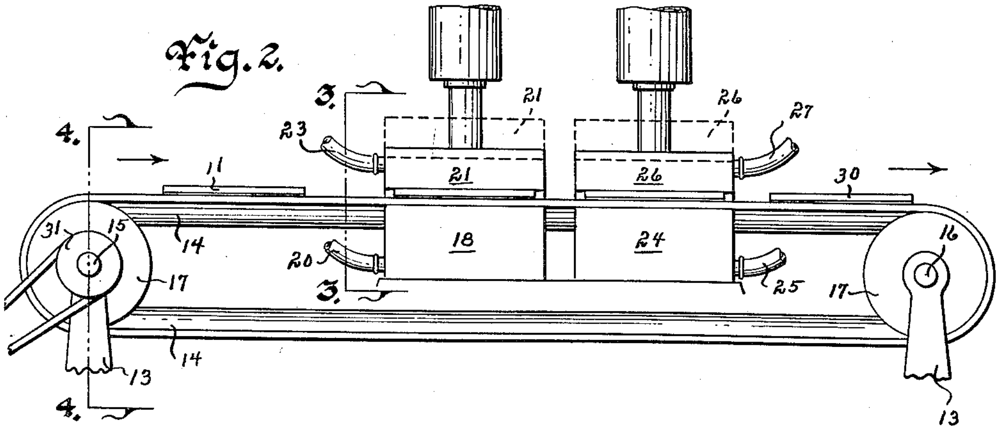
FIG. 2 is a side view of my machine for bonding the laminations of laminated printing plates.
Figure 5:
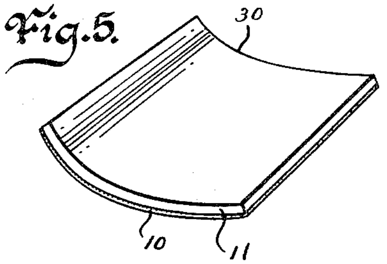
FIG. 5 is a perspective view of a printing plate after its laminations have been bonded.
Figure 4:
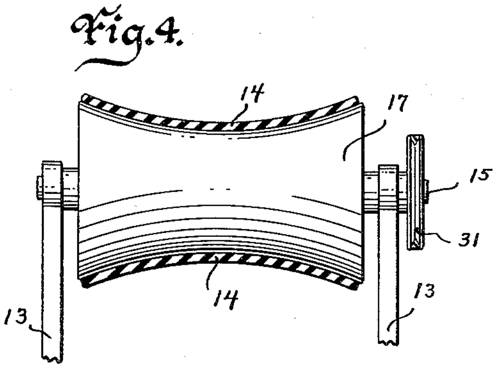
FIG. 4 is an enlarged cross sectional view of the belt and one of the belt supporting rollers and is taken on line 4—4 of FIG. 2.

In use, the loosely assembled plates 10 and 11, with the adhesive 12, is placed onto the top of the concave belt, in advance of the first press (which is a heated press) and with its printing face extending downwardly onto the rubber or like concave belt. With the upper jaw 21 open, the belt is rotated to bring the plate laminations between the jaws 18 and 21. The hot jaws are closed with the plate laminations and resilient belt between them. A pressure of approximately twenty-five tons is applied with the jaws at approximately two hundred and fifty degrees Farenheit. Because the jaws are preheated, only one to two minutes are required to heat the plates and adhesive and press them tightly together. The upper jaw 21 and jaw 26 are raised and the belt rotated to bring the hot printing plate between the cooling press jaws 24 and 26. The jaws of the second press are closed with substantially the same applied pressure of the first press, but because the second press is a cooling and compressing one, the plate is pressed, cooled and finished into an arcuate printing plate 30. While the last plate is being cooled, an incoming one is being heated and processed by the first press. Thus the procedure is an in line one and continuous. The time required to produce such plates is but a fraction of the time herebefore required. The belt not only acts as a carrier during the laminating of the plate unit but provides the necessary resiliency during the pressing of the plates. The belt may be hand moved, or if desired a powered pulley wheel 31 may be on one of the shafts and mechanically intermittently timed with suitable mechanism operating the two presses. The belt exits the finished plate from the second press as shown in FIG. 2.

Some changes may be made in the construction and arrangement of my method and means for bonding the laminations of printing plates without departing from the real spirit and purpose of my invention, and it is my intention to cover by my claim, any modified forms of structure or use of mechanical equivalents which may be reasonably included within their scope.

I claim:

In a device for mechanically securing together the laminations of a laminated printing plate, a frame, two spaced apart horizontal concave pulley wheels rotatably mounted on said frame, a continuous endless relatively wide flat concave flexible resilient belt embracing said two pulley wheels, a concave press jaw directly below the under side of the upper area of said belt having its concave width extending parallel with the width of said belt, a convex movable press jaw above the top side of the upper area of said belt and above said first mentioned press jaw having its convex width extending parallel with the width of said belt, a means for heating at least one of said jaws, a concave second press jaw directly below the under side of the upper area of said belt, a convex second movable press jaw above the top side of the upper area of said belt and above said second mentioned jaw that is below said belt, and a means for cooling at least one of said last mentioned jaws.

References Cited in the file of this patent

UNITED STATES PATENTS

| | | |
|---|---|---|
| 2,050,191 | Liebowitz | Aug. 4, 1936 |
| 2,162,825 | Richards | June 20, 1939 |
| 2,210,000 | Peel | Aug. 6, 1940 |
| 2,542,901 | Chaffee | Feb. 20, 1951 |
| 2,658,552 | Grevich | Nov. 10, 1953 |
| 2,912,043 | Bargholtz et al. | Nov. 10, 1959 |

FOREIGN PATENTS

| | | |
|---|---|---|
| 516,384 | Belgium | Jan. 15, 1953 |